United States Patent [19]
Garzelloni

[11] 3,958,684
[45] May 25, 1976

[54] ACCUMULATING CONVEYOR
[75] Inventor: Thomas L. Garzelloni, Spring Lake, Mich.
[73] Assignee: A W & H Manufacturing Co., Inc., Worth, Ill.
[22] Filed: Aug. 7, 1974
[21] Appl. No.: 495,303

[52] U.S. Cl. .......................................... 198/127 R
[51] Int. Cl.² ........................................ B65G 13/02
[58] Field of Search ............................... 198/127 R

[56] References Cited
UNITED STATES PATENTS
| | | | |
|---|---|---|---|
| 2,253,198 | 8/1941 | Regan | 198/127 R |
| 3,199,657 | 8/1965 | Harrison | 198/127 R |
| 3,502,197 | 3/1970 | Kato et al. | 198/127 R |

Primary Examiner—Evon C. Blunk
Assistant Examiner—Joseph E. Valenza
Attorney, Agent, or Firm—Hume, Clement, Brinks, Willian, Olds & Cook

[57] ABSTRACT
The invention provides an improved accumulating conveyor having a frame with a plurality of roller carriages mounted transversely. Each of the roller carriages comprises a pair of spaced end portions and a connecting portion connecting a lower part of these end portions. A pressure roller is rotatably mounted in a lower portion of each roller carriage, and a conveyor roller is rotatably mounted in an upper portion, parallel to and spaced from the pressure roller. An endless belt is mounted on the frame, and is positioned to pass between the pressure rollers and the conveyor rollers, the belt having a thickness less than the distance between the conveyor and pressure rollers. The belt has a thickened portion which has a thickness at least equal to the distance between the pressure and conveyor rollers, so that passage of the thickened portion causes rotation of these rollers. An intermittent drive force is thereby delivered to the conveyor rollers, and the presence of an article on the conveyor, or the movement of an article along the conveyor, causes the roller carriages to tilt into engagement with the drive belt. Stoppage of articles on the conveyor causes the carriages to tilt into a rearwardly titled position, so that no drive force is applied except by passage of the thickened portion of the belt.

10 Claims, 8 Drawing Figures

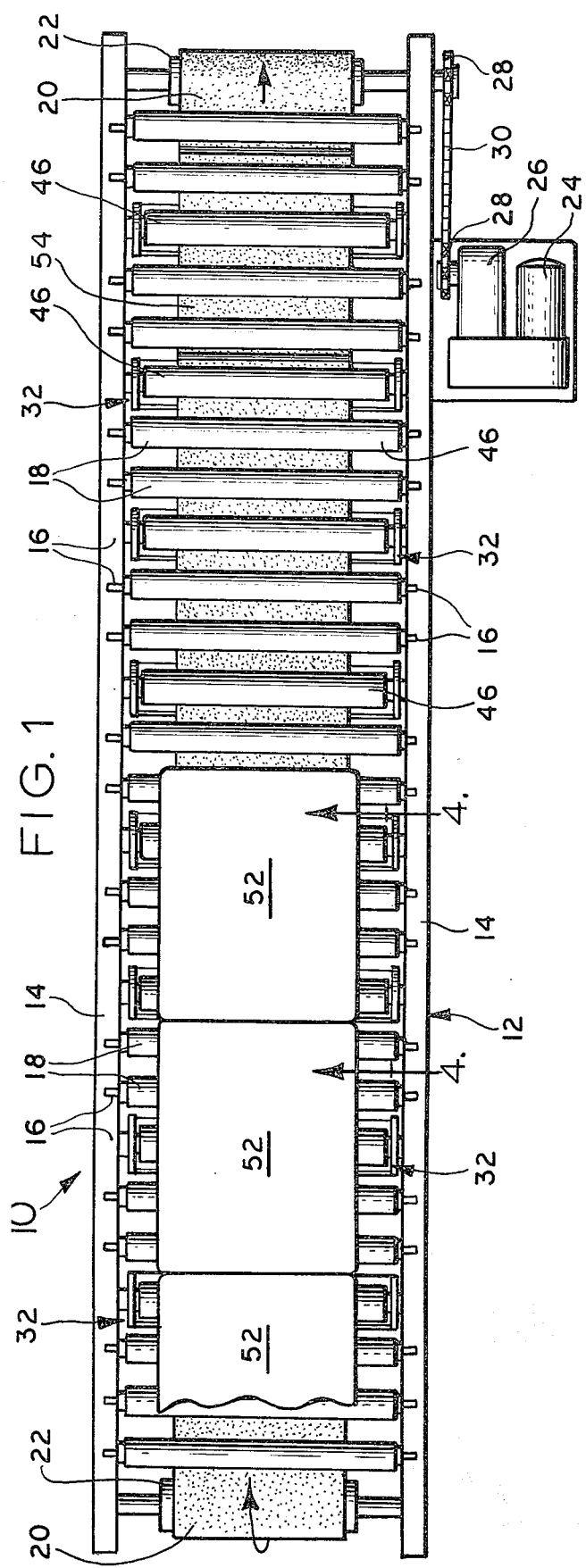
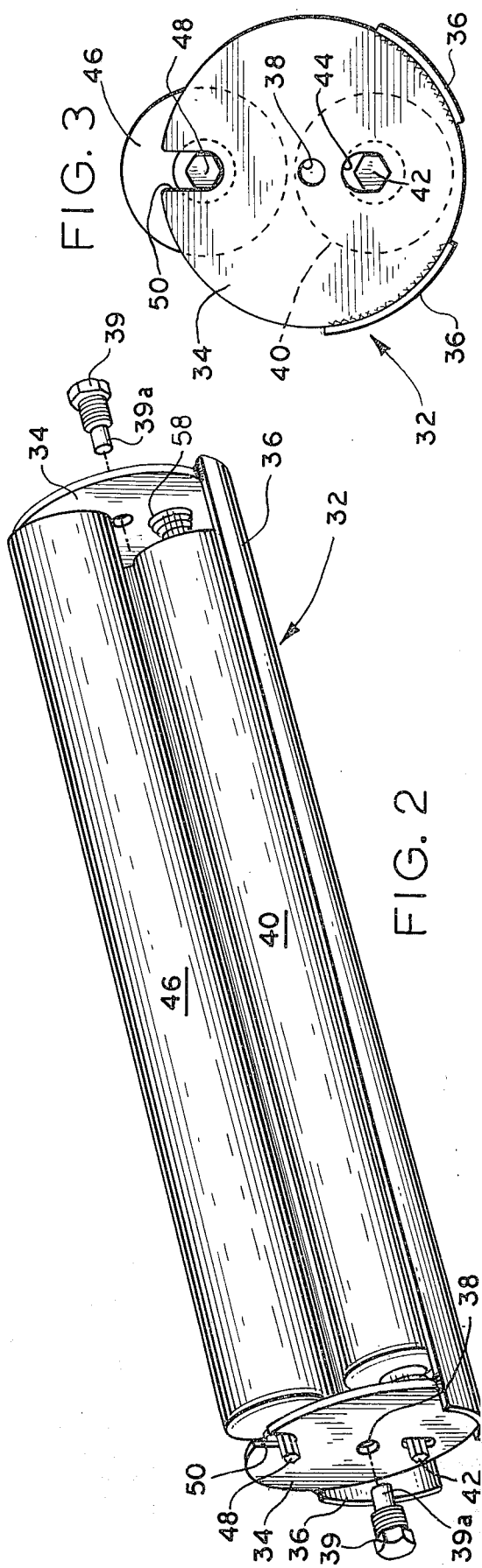

ACCUMULATING CONVEYOR

The present invention relates to an improved accumulating conveyor.

Live roller conveyors, having a frame and a plurality of transverse, belt-driven rollers, are well known in the art. It is often desirable to provide one or more sections of such a conveyor that are capable of accumulating articles being conveyed when a stoppage of article movement occurs downstream on the line. Such a stoppage might occur, for example, when the flow of articles is irregular, and a downstream portion of the handling process is unable to keep up with an increased flow. While articles can be stopped by simply blocking them on a conventional live-roller conveyor, as more and more articles build up, increased pressure is produced on the downstream articles. Such pressure can produce crushing of the articles, can throw articles off the conveyor, and a large buildup produces extremely high horsepower demands. Accordingly, it is often desirable to provide one or more sections of conveyor which produce a minumum of driving force on the articles being conveyed when a stoppage occurs, while producing continuous driving force when articles are free to move.

A wide variety of devices for reducing or eliminating the conveyor drive force upon accumulation of articles has been produced. However, such devices have heretofore suffered from a variety of disadvantages. Many of these devices are extremely complex, and are therefore subject to frequent breakdowns. Others produce only a reduction in the amount of drive force produced during an accumulation, and therefore do not fully eliminate the problem. Still other types, particularly those employing eccentric rollers, tend to be noisy when in operation.

In accordance with the present invention, an accumulating live-roller conveyor is produced which virtually eliminates the drive force during an accumulation of articles, yet produces a continuous drive force during the movement articles and is, at the same time, simple in construction and relatively noise-free. Generally, the apparatus of the present invention comprises a frame having a pair of parallel side members and a plurality of roller carriages rotatably mounted transversely on the frame between the side members. These roller carriages each comprise a pair of spaced end portions and a connecting portion connecting the end portions. Each of the roller carriages has means for rotatable attachment to the side members of the frame. A pressure roller is rotatably mounted in a lower portion of each roller carriage between the end portions, and a conveyor roller is rotatably mounted between the end portions in an upper portion of each carriage, parallel and spaced from the pressure roller. An endless drive belt is mounted on the frame, and positioned to pass between the pressure rollers and the conveyor rollers. This drive belt has a thickness which is less than the vertical clearance between the conveyor roller and the pressure roller, so that no drive force is imparted to the conveyor roller when the carriage is in a position of slight rearward tilt. The drive belt has a thickened portion having a thickness at least equal to the distance between the pressure roller and the conveyor roller, so that an intermittent driving force is delivered to the conveyor roller when the conveyor and drive rollers are in generally vertical alignment. Drive means are provided for moving the drive belt longitudinally along the frame, so that a rotational force is delivered to the conveyor roller by a passage of the thickened portion, and so that the carriage is rotated forwardly by the forward movement of an article carried by the conveyor rollers.

The invention, its construction, and method of operation, together with the objects and advantages thereof, will be best understood by reference to the following detailed description, taken in conjunction with the drawings, in which:

FIG. 1 is a plan view of a conveyor section constructed in accordance with the present invention, having articles accumulating thereon;

FIG. 2 is a perspective view of a roller carriage with its associated pressure and conveyor rollers, constructed in accordance with the present invention;

FIG. 3 is an end view of the roller carriage and rollers shown in FIG. 2;

Figure 4:
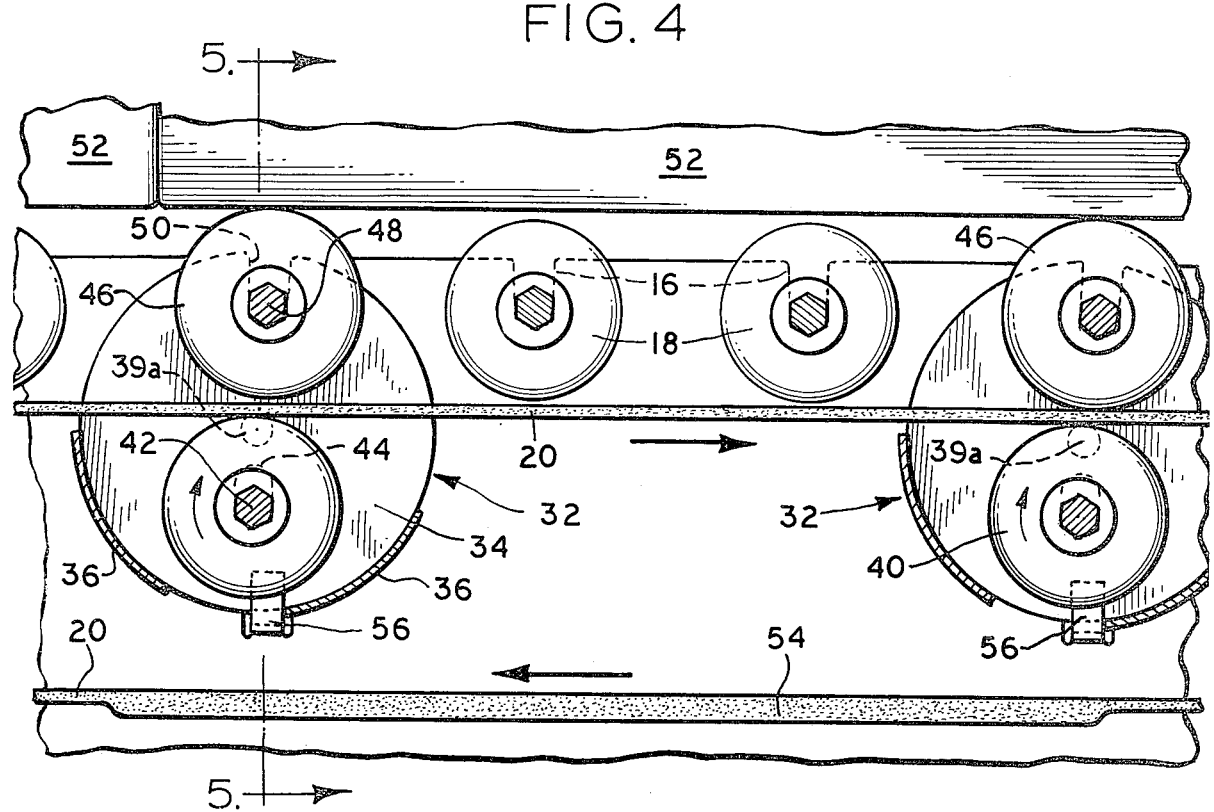
FIG. 4 is a cross-sectional view taken along line 4—4 of FIG. 1.

Referring now to the specific embodiment shown in the drawings, and particularly to FIG. 1, an accumulating conveyor section constructed in accordance with the present invention is generally indicated by reference numeral 10. As those skilled in the art will understand, such a conveyor section will ordinarily be employed in association with other conveyor sections, which may be either accumulating conveyors or conventional live-roller conveyors. It will also be understood that the length of the conveyor section may vary in accordance with requirements, and that the length will generally be in excess of the length shown in FIG. 1, which is relatively short for illustration purposes.

The accumulating conveyor section 10 has a frame, generally 12, having a pair of parallel side members 14. The side members 14 have a plurality of spaced U-shaped slots 16, which are adapted to receive the shafts of idler rollers 18.

The frame 12 has an endless drive belt 20 connected to rollers 22, which are journalled to the side members 14 at the ends of the conveyor. The drive belt 20 has thickened portions, and is positioned to pass between the pressure and conveyor rollers, as hereinafter described. One of the rollers 22 is driven by suitable drive means, such as an electric motor 24 having a reduction gear box 26. In the embodiment shown, the shaft 22 is rotated through a pair of pulleys 28 and a power transmission belt 30.

Mounted between the side members 14 are a plurality of roller carriages, generally indicated by reference numeral 32. As best shown in FIGS. 2 and 3, these roller carriages 32 each have a pair of spaced end portions 34 and connecting bars 36 connecting a lower part of the end portions 34. The roller carriages 32 each have circular mounting holes 38 on each end, which form bearing surfaces for rotatable attachment to the side members 14 by means of bolts 39 having threadless end portions 39a. Each roller carriage 32 has a pressure roller 40 rotatably mounted in a lower portion thereof between the end portions 34. These pressure rollers 40 have a shaft 42 which passes through openings 44 in the end portions 34.

Each carriage 32 also has a conveyor roller 46 rotatably mounted between the end portions 34 in an upper portion of the carriage 32, parallel to and spaced from the pressure roller 40.

The distance between the pressure roller 40 and the conveyor roller 46 should be adequate to provide a vertical clearance between the rollers 40, 46 which is greater than the thickness of the belt 20 when the carriage 32 is in a rearwardly tilted or accumulating position, as shown in FIG. 4. However, this distance must be small enough to permit driving contact with the belt 20 when the carriages are tilted into their forward, or drive position, as shown in the right-hand portion of FIG. 6.

Each conveyor roller 46 has a shaft 48 which passes through U-shaped slots 50 in the end portions 34. These U-shaped slots 50 are provided as a safety measure, so that the conveyor rollers 46 will pop out of their slots 50 in the event that a worker were to catch his hand or the like between the belt 20 and the conveyor roller 46. As previously mentioned, U-shaped slots 16 are similarly provided for the idler rollers 18. As can be seen in FIGS. 2 and 3, the circular mounting holes 38 in the roller carriages 32 are positioned between the shaft 42 of the pressure roller 40 and the shaft 48 of the conveyor roller 46.

Referring again to FIG. 1, in the embodiment shown, each accumulating roller carriage 32 is separated by a pair of idler rollers 18. It will be understood by those skilled in the art that the ratio of accumulating rollers to idler rollers is purely optional, and will depend largely upon the size of articles being conveyed. A larger number of idler rollers, a smaller number, or no idler rollers at all, may be employed in accordance with the present invention. FIG. 1 illustrates a plurality of articles 52 accumulated on the conveyor 10, and it can be seen that these articles are long enough to simultaneously cover two roller carriages 32. In the event that shorter articles are being conveyed, a larger proportion of accumulating roller carriages 32 is desirable.

Figure 5:
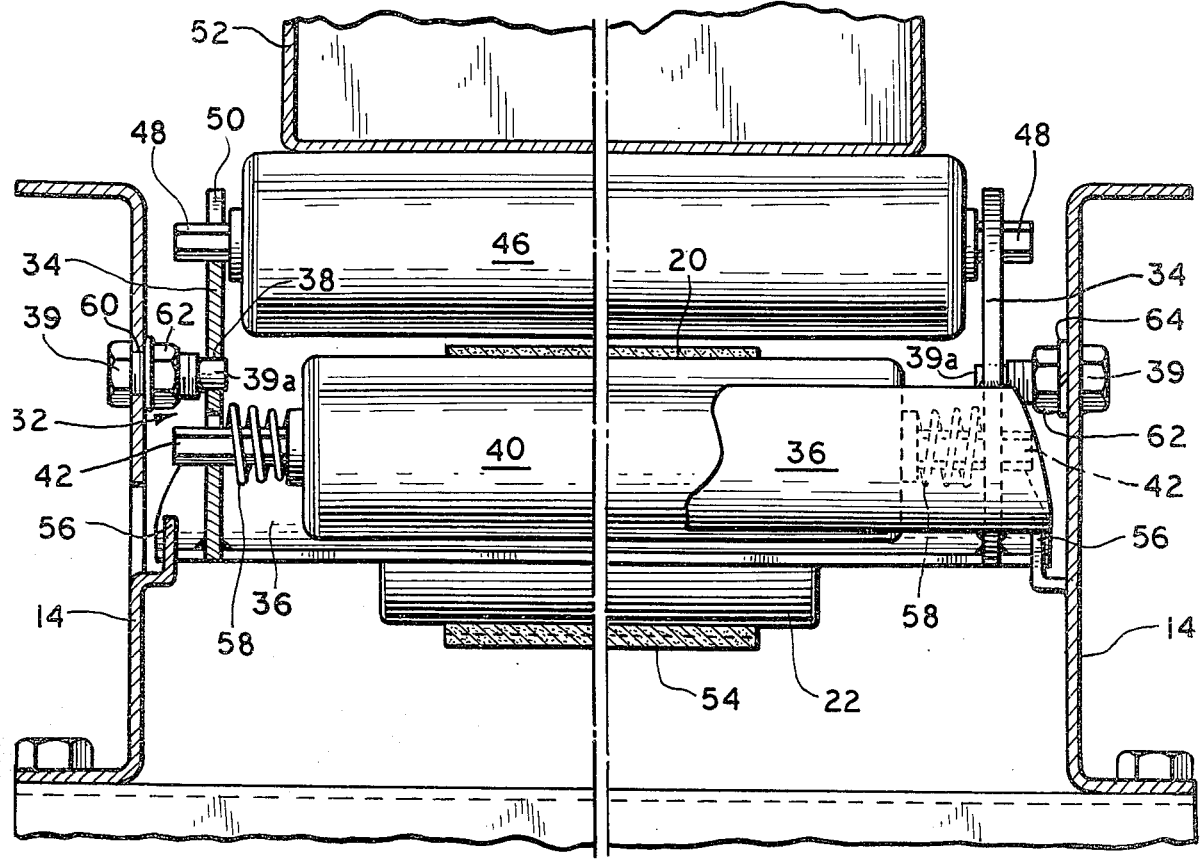
FIG. 5 is a cross-sectional view taken along line 5—5 of FIG. 4.

Referring to FIGS. 4 and 5, it will be seen that the drive belt 20 has a thickened portion or pad 54 located thereon. This thickened portion has a thickness which is at least equal to the distance between the drive rollers 40 and the conveyor rollers 46, but is preferably of insufficient thickness to contact the idler rollers 18. It is thus seen that, in the preferred embodiment, no drive force is transmitted at any time to the idelr rollers 18. It is, of course, possible to have any number of thickened portions 54 on the belt 20, and the number of thickened portions 54 will be determined by a number of factors, including the overall length of the accumulating conveyor section 10 and the frequency with which it is desired to provide a driving impulse to the article 52. Similarly, the length of the thickened portion 54 may be varied, and this length is determined the duration of the driving impulse. The length of the thickened portion 54 will depend upon such factors as the speed at which the drive belt 20 moves and the weight of the article 52 being conveyed, since heavy articles may require a driving impulse of longer duration in order to initiate motion, as hereinafter described.

As shown in FIGS. 4 and 5, in the preferred embodiment the connecting bars 36 extend beyond the ends of the end portions 34, and contact a pair of stop tabs 56 in the side members 14. As best shown in FIG. 4, this stop tab prevents the rearwardly rotation (i.e., rotation opposite the direction of movement of articles) beyond a position slightly to the rear of vetical alignment between the pressure roller 40 and the conveyor roller 46. In the preferred embodiment, these stop means also limit rotation of the carriage 32 in a forward direction (i.e., rotation in the direction of movement of articles) beyond a predetermined limit, so that excessive rotation is not produced by heavy articles being carried by the conveyor. Rotation of the carriage to this limit is illustrated in the left-hand portion of FIG. 7.

The detail of construction and mounting of the carriage 32 is best shown in FIG. 5. Each pressure roller 40 is mounted to an octagonal shaft 42 through internal bearings (not shown). The roller 40 is maintained in its proper location by a pair of springs 58, which provide for easy installation and removal of the pressure roller 40, and also aid in silent running of the conveyor 10 by preventing rattling. The conveyor rollers 46 also have octagonal shafts 48 and internal bearings (not shown). If desired, springs similar to springs 58 may be provided in order to increase the silence of the running of the conveyor rollers 46. Although not shown in FIG. 5, the idler rollers 16 are mounted directly on the side members 14 in a manner similar to the mounting of the conveyor rollers 46.

The overall roller carriage 32 is mounted on the side members 14 through an aperture 60. The bolt 39 passes through the aperture 60, and the threadless end portion 39a fits into the mounting hole 38 loosely enough to permit rotation of the roller carriage 32. The threaded portion of the bolt 39 prevents lateral movement of the roller carriage 32. EAch bolt 39 is held tightly to the side members 14 by a nut 62 and lock washer 64 mounted on the threaded portion.

Figure 8:
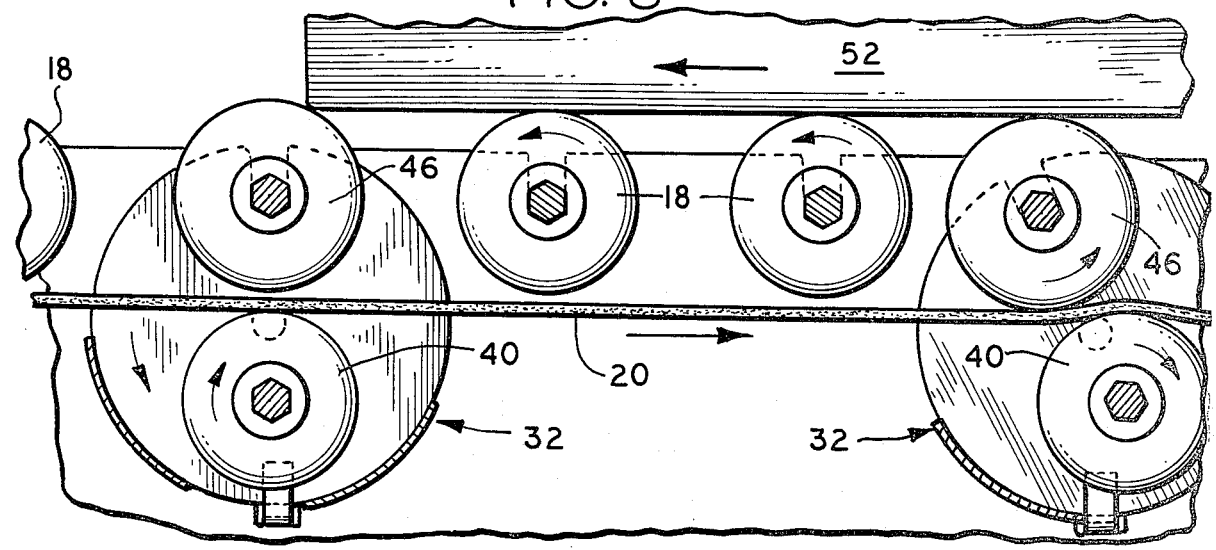
FIG. 8 is a third sequential view, showing the passage of an article without the passage of a thickened portion of the drive belt.

In the preferred embodiment shown, the connecting bars 36 provide adequate weight so that, in the absence of a load, the pressure roller 40 and conveyor roller 46 are in a position of generally vertical alignment, as shown in the left-hand portion of FIG. 8.

The operation of the apparatus will be best understood by reference to FIGS. 4, 6, 7, and 8. FIG. 4 illustrates a pair of articles 52 in a stopped position, when an accumulation of articles occurs. The roller carriages 34 are in positions of slight rearward tilt, i.e., the conveyor rollers 46 are slightly to the rear of the pressure rollers 40. In this position, the end of the rear connecting bar 36 is in contact with the stop 56. As can be seen in the drawing, no drive force is being imparted to any of the conveyor rollers 46, and, at no time is any drive force imparted to the idler rollers 18. Because of the slightly smaller diameter of the idler rollers 18, these rollers are also out of contact with both the articles 52 and the drive belt 20.

The slight rearward tilt of the roller carriages 32, as shown in FIG. 4, is desirable in that it tends to lock the carriages 32 into the accumulating position, and to prevent the rollers 40, 46 from engaging the drive belt 20 as a result of the weight or of a slight shifting of the articles 52. Only a slight rearward tilt is required, say, 2°–10° to the rear of vertical alignment of the rollers 40, 46. The precise angle is not critical, however, the angle should not be great enough to permit engagement of the drive belt 20 with the rollers 40, 46.

Passage of the thickened portion 54 of the drive blet 20 during an accumulation of articles 52 will produce a momentary drive force on each of the conveyor rollers 46 as the thickened portion 54 passes. However, since the thickened portion 54 will be in contact with only one or two conveyor rollers 46 at any one time, only a relatively small amount of driving force is produced, and very little load will be placed on the motor 24 or on the articles 52. However, after the stoppage which results in the accumulation is removed, the passage of the thickened portion 54 will initiate movement of the articles. Such initiation of movement is illustrated in FIG. 6.

Figure 6:
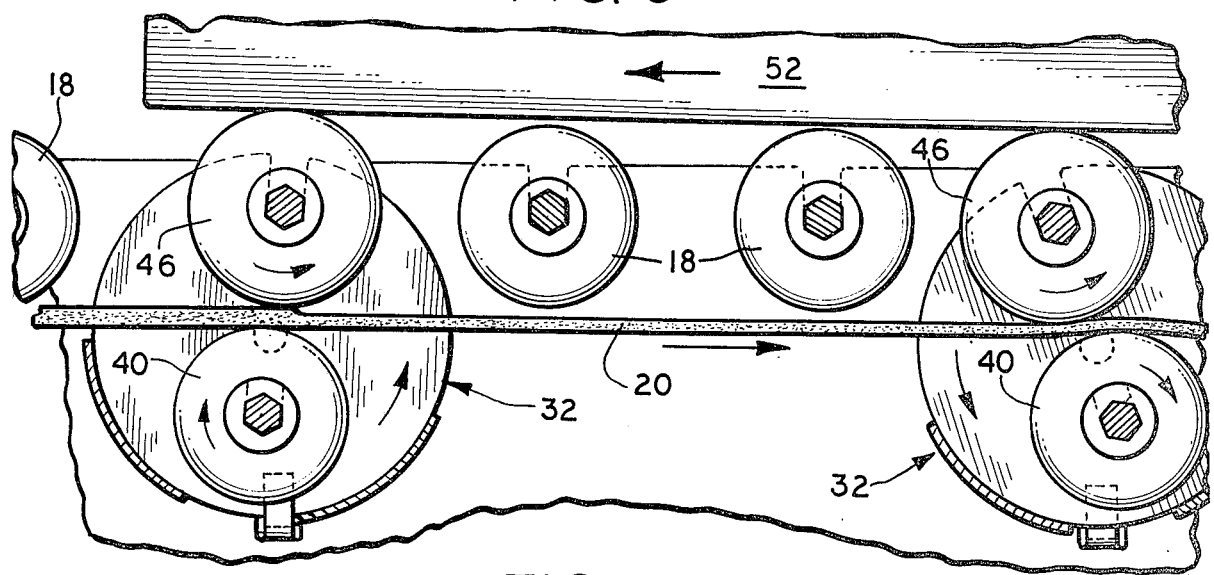
FIG. 6 is a first sequential view showing the initiation of movement of an article by the passage of a thickened portion of the belt.
Figure 7:
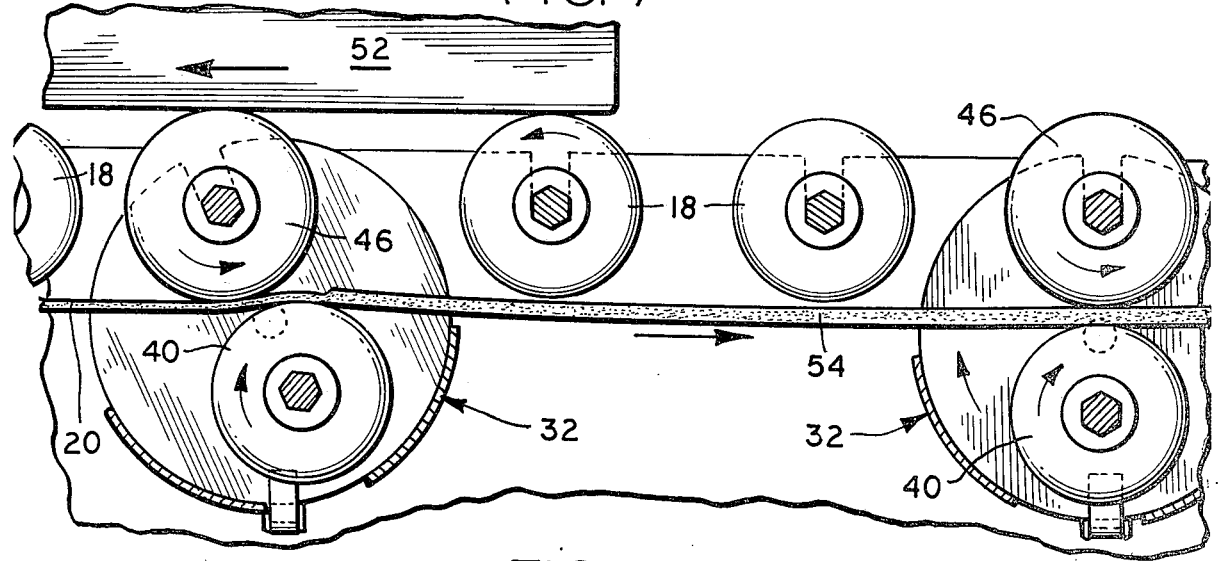
FIG. 7 is a second sequential view, showing the continued passage of the thickened portion.

Referring to FIG. 6, as the thickened portion 54 passes, the conveyor roller 46 is caused to rotate, producing movement of the article 52. This movement of the article 52 will also cause the adjacent roller carriage 32 to tilt into driving contact with the belt 20, as shown in the right-hand portion of FIG. 6. As the thickened portion i54 continues to move, the movement of the article 52 will cause the left-hand roller carriage 40 to tilt, as shown in FIG. 7, and the driving force is continued. The passage of the pad 54 will erect the right-hand carriage 32, and will produce continued rotation of the conveyor roller 46. As indicated in FIG. 7, the tilting of the carriage 32 also lowers the article 52 so that it may contact the idler rollers 18.

As the article 52 continues to move downstream, it contacts successive conveyor rollers 46, and causes the roller carriages 32 to tilt into a driving position, as indicated in the right-hand portion of FIG. 8. In that figure, the left-hand roller carriage is about to be tilted into a drive position. It is thus seen that, once an article 52 is moving along the conveyor 10, a continuous driving force is produced as the article contacts successive conveyor rollers 46. Thus, the accumulating conveyor of the present invention is self-starting. and also has the desirable feature of producing a separation between the articles being conveyed because of the intermittent initiation of movement by the thickened portion 54 of the belt 20.

Obviously, many modifications and variations of the invention will occur to those skilled in the art, and it is intended to cover in the appended claims all such modifications and variations as fall within the true spirit and scope of the invention.

I claim:

1. An improved accumulating conveyor comprising:
   a frame having a pair of parallel side members;
   a plurality of roller carriages rotatably mounted transversely on said frame between said side members, said roller carriages each comprising a pair of spaced end portions and a connecting portion connecting said end portions;
   a pressure roller rotatably mounted on a lower portion of each roller carriage between said end protions;
   a conveyor roller rotatably mounted between said end portions in an upper portion of each roller carriage parallel to and spaced from said pressure roller;
   means for mounting said roller carriages between said side members for rotation about an axis between the axes of rotation of said pressure and conveyor rollers;
   an endless drive belt mounted on said frame and positioned to pass between said pressure rollers and said conveyor rollers, said belt having a thickness less than the distance between said conveyor roller and said pressure roller, and said belt having a thickened portion having a thickness at least equal to the distance between said pressure roller and said conveyor roller; and
   drive means for moving said drive belt longitudinally along said frame, whereby a rotational force is delivered to said conveyor roller by the passage of said thickened portion, and whereby said carriage is rotated forwardly by the forward movement of an article carried by said conveyor roller.

2. The apparatus as defined in claim 1, further comprising stop means for preventing the rearward rotation of said carriage beyond a position slightly to the rear of vertical alignment of said pressure and conveyor rollers.

3. The apparatus as defined in claim 2 further comprising stop means for limiting the forward rotation of said carriage beyond a predetermined limit.

4. The apparatus as defined in claim 1, further comprising idler rollers rotatably mounted on said frame and interspersed between said conveyor rollers.

5. The apparatus as defined in claim 1 wherein said roller carriages are weighted on a lower portion thereof to deliver said carriages to a position of generally vertical alignment between said pressure roller and said conveyor roller in the absence of a load being carried by said conveyor roller.

6. The apparatus as defined in claim 5 wherein said connecting portion comprises a pair of spaced, parallel bars connecting a lower part of said end portions.

7. The apparatus as defined in claim 6 further comprising stop tabs on at least one of said frame members, at least one of said stop tabs being associated with each roller carriage, and positioned to contact said parallel bars, said stop tabs and said parallel bars being constructed and arranged to prevent the rearward rotation of said carriage beyond a position slightly to the rear of vertical alignment of said pressure and conveyor rollers, and to limit the forward rotation of said carriage beyond a predetermined limit.

8. An improved accumulating conveyor comprising:
   a frame having a pair of parallel side members;
   a plurality of roller carriages rotatably mounted transversely on said frame between said side members, said roller carriages each comprising a pair of spaced end portions and a pair of spaced, parallel connecting bars connecting a lower part of said end portions;
   a pressure roller rotatably mounted in a lower portion of each roller carriage between said end portions;
   a conveyor roller rotatably mounted between said end portions in an upper portion of each roller carriage, parallel to and spaced from said drive roller;
   means for mounting said roller carriages between said side members for rotation about an axis between the axes of rotation of said pressure and conveyor rollers;
   stop tabs on at least one of said frame members, at least one of said stop tabs being associated with each roller carriage, said stop tabs being positioned to contact said parallel bars on rotation of said carriage, said stop tabs and said parallel bars being constructed and arranged to prevent rearward rotation of said carriage beyond a position slightly to the rear of vertical alignment of said pressure and conveyor rollers, and to limit the forward rotation of said carriage beyond a predetermined limit;

an endless drive belt mounted on said frame and positioned to pass between said pressure rollers and said conveyor rollers, said drive belt having a thickness less than the distance between said conveyor roller and said pressure roller, and said belt having a thickened portion having a thickness at least equal to the distance between said pressure roller and said conveyor roller; and drive means for moving said drive belt longitudinally along said frame, whereby a rotational force is delivered to said conveyor roller by the passage of said thickened portion, and whereby said carriage is rotated forwardly by the forward movement of an article carried by said conveyor roller.

9. The apparatus as defined in claim 8 further comprising idler rollers rotatably mounted on said frame, and interspersed between said conveyor rollers.

10. The apparatus as defined in claim 18 wherein each of said roller carriage is weighted on a lower portion thereof to deliver said carriage to a position of generally vertical alignment between said pressure roller and said conveyor roller in the absence of a load being carried by said conveyor roller.

* * * * *

UNITED STATES PATENT AND TRADEMARK OFFICE
CERTIFICATE OF CORRECTION

PATENT NO. : 3,958,684
DATED : May 25, 1976
INVENTOR(S) : Thomas L. Garzelloni

It is certified that error appears in the above-identified patent and that said Letters Patent are hereby corrected as shown below:

Column 4, line 57, "articles" should be --article--.

Column 5, line 20, "i54" should be --54--.

Column 8, line 7, "18" should be --8--.

Signed and Sealed this

Thirty-first Day of August 1976

[SEAL]

Attest:

RUTH C. MASON
Attesting Officer

C. MARSHALL DANN
Commissioner of Patents and Trademarks